United States Patent
Cepuran

(10) Patent No.: US 9,569,552 B2
(45) Date of Patent: Feb. 14, 2017

(54) CODE BASED CONFIGURATION OF MOBILE DEVICES

(75) Inventor: Brian Cepuran, Kitchener (CA)

(73) Assignee: D2L CORPORATION, Kitchener, Ontario (CA)

( * ) Notice: Subject to any disclaimer, the term of this patent is extended or adjusted under 35 U.S.C. 154(b) by 0 days.

(21) Appl. No.: 13/563,230

(22) Filed: Jul. 31, 2012

(65) Prior Publication Data

US 2014/0034726 A1   Feb. 6, 2014

(51) Int. Cl.
*G06K 7/10*   (2006.01)
*G06F 17/30*   (2006.01)

(52) U.S. Cl.
CPC ............... *G06F 17/30879* (2013.01)

(58) Field of Classification Search
USPC ............... 235/462.25, 472.01, 486
See application file for complete search history.

(56) References Cited

U.S. PATENT DOCUMENTS

| | | | |
|---|---|---|---|
| 6,149,063 A * | 11/2000 | Reynolds et al. | 235/472.02 |
| 6,816,154 B2 * | 11/2004 | Wong et al. | 345/175 |
| 8,267,320 B2 * | 9/2012 | Bandholz et al. | 235/454 |
| 2003/0218067 A1 * | 11/2003 | Parker et al. | 235/454 |
| 2007/0103725 A1 * | 5/2007 | Kawahara et al. | 358/1.15 |
| 2013/0244615 A1 * | 9/2013 | Miller | 455/411 |

* cited by examiner

*Primary Examiner* — Ahshik Kim
(74) *Attorney, Agent, or Firm* — Gowling WLG (Canada) LLP; Neil Henderson

(57) ABSTRACT

A processor implemented method of configuring an application on a mobile device comprising a code reading device is disclosed herein. The method comprises: reading a code with the code reading device, the code relating to an organization; and configuring at least one parameter of a first application of the mobile device based on the code.

18 Claims, 4 Drawing Sheets

CODE BASED CONFIGURATION OF MOBILE DEVICES

FIELD

The present disclosure relates generally to systems and methods for configuring applications of mobile devices. More particularly, the present disclosure relates to systems and methods for configuring applications of mobile devices based on a readable code.

BACKGROUND

When configuring applications of a mobile device, a user is generally required to configure certain parameters of the applications. For example, the user may be required to enter a Uniform Resource Locator (URL) of a portal associated with an organization into the browser of the mobile device. In some cases, the URL may be different than the URL of the main webpage of the organization. Alternatively, the user may be required to configure one or more applications by sending particular values of one or more parameters of the application.

The above information is presented as background information only to assist with an understanding of the present disclosure. No determination has been made, and no assertion is made, as to whether any of the above might be applicable as prior art with regard to the present invention.

SUMMARY

In a first aspect, the present disclosure provides a processor implemented method of configuring an application on a mobile device comprising a code reading device, the method comprising: reading a code with the code reading device, the code relating to an organization; and configuring at least one parameter of a first application of the mobile device based on the code.

In some embodiments, the code comprises a value of the at least one parameter.

In various embodiments, the code comprises an organization identification (ID) related to the organization. In some such embodiments, the method further comprises: identifying the at least one parameter associated with the organization ID. in some embodiments, the mobile device comprises a storage device having stored thereon parameters associated with a plurality of organizations; and identifying the at least one parameter comprises: searching the storage device for the at least one parameter based on the organization ID.

In some embodiments, identifying the at least one parameter comprises: transmitting a message to a server, the message comprising an identifier of the organization; receiving a response; and identifying the at least one parameter based on the response.

In some embodiments, the response comprises the at least one parameter of the first application.

In some embodiments, the message identifies the first application.

In various embodiments, the message comprises version information for the first application.

In some embodiments, the code comprises an identifier of a server, and the method further comprises: transmitting a message to the server, the message comprising an identifier of the first application; receiving a response; and identifying the at least one parameter based on the response.

In some embodiments, the response comprises the at least one parameter of the first application.

In some embodiments, the message identifies the first application.

In some embodiments, the message comprises version information for the first application.

In some embodiments, the method further comprises: setting at least one parameter of a second application of the mobile communication device based on the code, the parameter corresponding to the organization.

In some embodiments, the at least one parameter comprises a Uniform Resource Locator (URL) associated with the organization. In some embodiments, the organization comprises an educational institution.

In various embodiments, the code comprises a Quick Response (QR) code or a bar code.

In some embodiments, the first application comprises a code reading application.

In some embodiments, reading the code comprises capturing an image of the code and processing the image to interpret the code.

In another aspect, the present disclosure provides a non-transitory machine-readable memory storing statements and instructions for execution by a processor for implementing a method of configuring an application on a mobile device comprising a code reading device, the method comprising: reading a code with the code reading device, the code relating to an organization; and configuring at least one parameter of a first application of the mobile device based on the code.

In some embodiments, the code comprises a value of the at least one parameter.

In various embodiments, the code comprises an organization identification (ID) related to the organization. In some such embodiments, the method further comprises: identifying the at least one parameter associated with the organization ID. in some embodiments, the mobile device comprises a storage device having stored thereon parameters associated with a plurality of organizations; and identifying the at least one parameter comprises: searching the storage device for the at least one parameter based on the organization ID.

In some embodiments, identifying the at least one parameter comprises: transmitting a message to a server, the message comprising an identifier of the organization; receiving a response; and identifying the at least one parameter based on the response.

In some embodiments, the response comprises the at least one parameter of the first application.

In some embodiments, the message identifies the first application.

In various embodiments, the message comprises version information for the first application.

In some embodiments, the code comprises an identifier of a server, and the method further comprises: transmitting a message to the server, the message comprising an identifier of the first application; receiving a response; and identifying the at least one parameter based on the response.

In some embodiments, the response comprises the at least one parameter of the first application.

In various embodiments, the message identifies the first application.

In some embodiments, the message comprises version information for the first application.

In some embodiments, the method further comprises: setting at least one parameter of a second application of the mobile communication device based on the code, the parameter corresponding to the organization.

In some embodiments, the at least one parameter comprises a Uniform Resource Locator (URL) associated with the organization. In some embodiments, the organization comprises an educational institution.

In various embodiments, the code comprises a Quick Response (QR) code or a bar code.

In some embodiments, the first application comprises a code reading application.

In some embodiments, reading the code comprises capturing an image of the code and processing the image to interpret the code.

In another aspect, the present disclosure provides a mobile device comprising: a code reading device; and a processor coupled to the code reading device, the processor configured to: accept an input from the code reading device based on a code relating to an organization; and set at least one parameter of a first application of the mobile device based on the code.

In some embodiments, the code comprises a value of the at least one parameter.

In various embodiments, the code comprises an organization identification (ID) related to the organization; and wherein the processor is further configured to: identify the at least one parameter associated with the organization ID.

In some embodiments, the mobile devices comprises: a storage device having stored thereon parameters associated with a plurality of organizations; and wherein the processor is further configured to: search the storage device for the at least one parameter based on the organization ID.

In some embodiments, the processor is configured to: transmit a message to a server, the message comprising an identifier of the organization; receive a response; and identify the at least one parameter based on the response.

In some embodiments, the response comprises the at least one parameter of the first application.

In some embodiments, the message identifies the first application.

In some embodiments, the message comprises version information for the first application.

In some embodiments, the code comprises an identifier of a server; and wherein the processor is further configured to: transmit a message to the server, the message comprising an identifier of the first application; receive a response; and identify the at least one parameter based on the response.

In some embodiments, the response comprises the at least one parameter of the first application.

In some embodiments, the message identifies the first application.

In some embodiments, the message comprises version information for the first application.

In various embodiments, the processor is further configured to: set at least one parameter of a second application of the mobile communication device based on the code, the parameter corresponding to the organization.

In some embodiments, the at least one parameter comprises a Uniform Resource Locator (URL) associated with the organization.

In some embodiments, the organization comprises an educational institution.

In various embodiments, the code comprises a Quick Response (QR) code or a bar code.

In some embodiments, the first application comprises a code reading application.

In some embodiments, the input from the code reading device comprises an image of the code and the processor is further configured to interpret the code based on the image of the code.

Other aspects and features of the present disclosure will become apparent to those of ordinarily skill in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

Throughout the drawings, it should be noted that like reference numbers are used to depict the same or similar elements, features, and structures.

DETAILED DESCRIPTION

Figure 1:
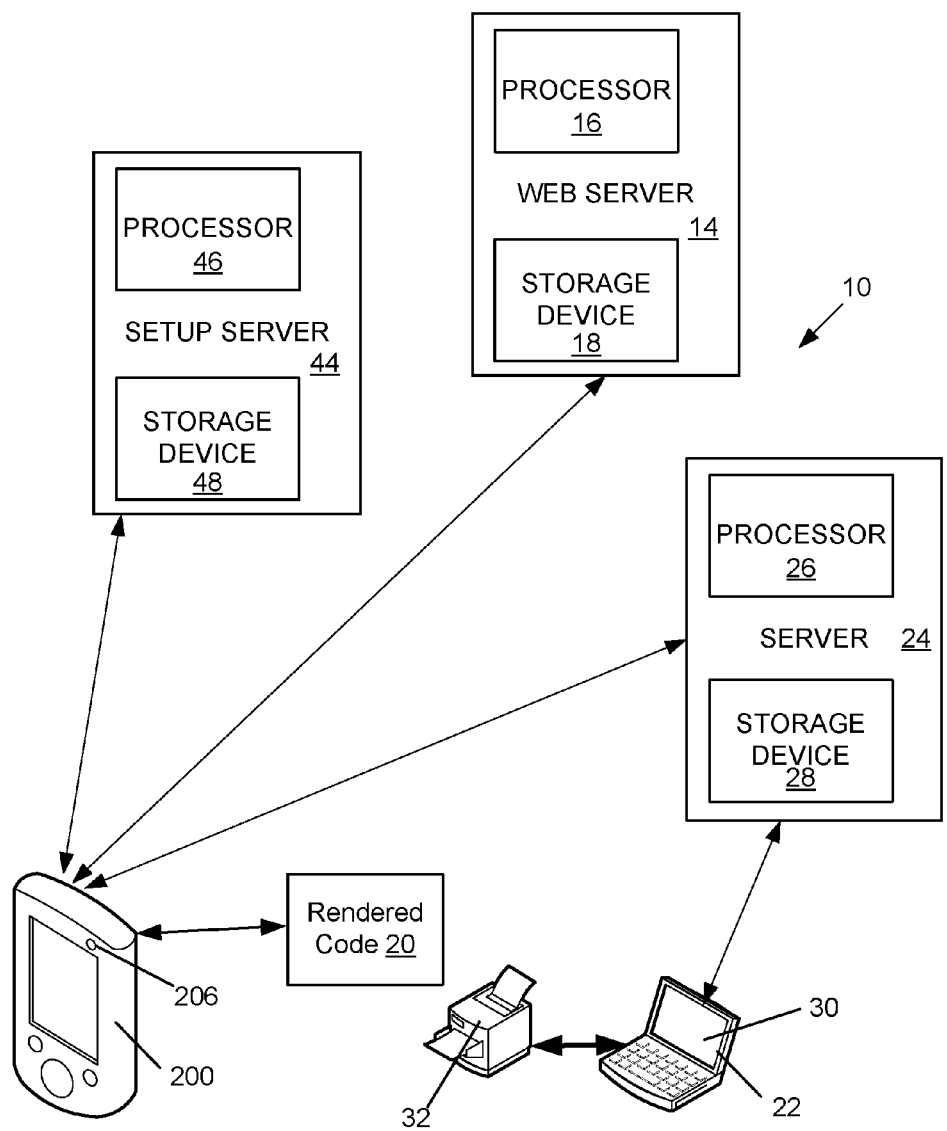
FIG. 1 is a block diagram of a system according to various embodiments.

Generally, the present disclosure provides a method and system for configuring applications of a mobile device for use with the systems of an organization.

A user of a mobile device is generally required to configure the device in some manner to operate suitably with the systems of the organization by configuring appropriate parameters in applications running on the device. In some instances this can include entering a URL into a browser of the mobile device to access a portal associated with an organization. Such a task may seem to be very simple. However, in some instances, the URL of the portal may be completely different than the URL of a main website of the organization and the URL of the portal may not be easily or readily determined by the user based on information generally available to him or her. Accordingly, it may be frustrating and time-consuming for the user to search for and determine the URL of the portal.

Similarly, some applications, which may be useful to the user in managing his or her interactions with the organization, may need to have parameters configured in order to operate appropriately with systems of a particular organization. For example, the applications may need to be "customized" to the particular requirements of the organization. As an illustrative nonlimiting example, the organization may be a university and the application may be an application that manages the users' course list and timetables. Such an application may need to interact with one or more servers of the organization in order to obtain relevant information regarding the courses in order to generate the timetable for the user. In general, it may be difficult for the user to easily determine which parameters of a given application should be configured and to what values they should be set to. Therefore, configuring an application may be a frustrating and time-consuming process for a user. Accordingly, it is desirable to have a system and method that automates at least part of the configuration process for the user.

As used herein, the term application of refers to any program or application that is operated by a mobile device. The term mobile device, as used herein, refers to any appropriate mobile communications device and can include, for example, but is not limited to, a smart phone or a tablet computer. The application can be a downloaded from, for example, but is not limited to, a developer, the organization, or a third party vendor such as for example, an "app store".

In some embodiments, the application is a general application that is customizable to a particular organization by, for example, setting parameters. These parameters may for example include such things as URLs of servers associated with the organization.

For example, in some embodiments the organization is an educational institution, such as a university, and the application relates to courses taken by a student who is the user of the mobile device. The student can download the application from, for example, an app store or the university website. The application may for example communicate with one or more servers associated with the university that have URLs that are different than those of the main website or portal that the student may log into using their personal computer.

Various embodiments described herein make use of a code, which can for example be QR code or a bar code, to configure the application on the mobile device. The code can be generated and provided to the user in any suitable manner. For example, it can be generated by a website or portal that the user logs into using their personal computer. The code can be rendered by displaying it on the display or by printing it using a printer. Alternatively, the code can be included on course materials, brochures or other publications and materials provided by or on behalf of the educational institution.

In various embodiments, the code includes instructions or parameters for customizing the program to operate in conjunction with the systems of the organization. In some embodiments, the code can include parameters that are specific to the user. For example, if the code is generated through a portal, then the code can include information or parameters that reflect courses taken by the user and configure the program appropriately. In some embodiments, the code includes an identifier of the university and a URL of a server from which information can be obtained for configuring the program for use with the university.

Reference is now made to FIG. 1, which illustrates a block diagram of a system 10, according to various embodiments.

System 10 is used to configure an application or program on mobile device 200 for use with server 14 of an organization. In various embodiments, server 14 may be for example, a web server operated by an organization such as, for example, but not limited to, a university, high school, or other educational institution. In other embodiments, the organization may be for example, but is not limited to, a business entity, including a corporation, or a government entity or organization. In various embodiments, server 14 includes a processor 16 and a storage device 18.

In some embodiments, server 14 is a web server and hosts a web service such as a website or a web portal associated with the organization.

The application is configured by reading a rendered code 20 with a code reader 206 of mobile device 200. In some embodiments, code reader 206 is a camera. As mentioned above, rendered code 20 can be any suitable code, including but not limited to, a QR code or a barcode. The rendered code can be provided to the user in any appropriate manner. For example, the rendered code 20 may be printed on materials provided by the organization. For example, in the case of an educational institution such as a university, the rendered code 20 may be printed on course materials, pamphlets, or other publications and materials associated with the University.

In some embodiments, the rendered code may be generated by the user by, for example, using his or her personal computer 22 to navigate to a webpage operated by or on behalf of the organization on server 24. In some embodiments, server 24 is distinct from Web server 14. In other embodiments, server 24 and Web server 14 are the same server. In various embodiments, server 24 includes a processor 26 and a storage device 28.

Server 24 allows a user to retrieve or generate a code that is particular to the organization. For example, the code may be stored on a storage device 28 of server 24. The code can be provided to the user by displaying it on the display 30 of the user's computer 22 or by printing it on a printer 32. In either case, server 24 allows the user to generate a rendered code 20 that is readable by code reader 206 of mobile device 200. Accordingly, the user is then able to read the rendered code 20 with the mobile device 200 as explained above and described in greater detail below.

Based on the rendered code 20 that is read, mobile device 200 sends a message to a setup server 44. In various embodiments, the message includes information that identifies a particular organization. In various embodiments, server 44 includes a processor 46 and a storage device 48.

Based on the message received from mobile device 200, setup server 44 sends a response back to mobile device 200. The response can include parameters or information that enables an application (i.e., either the application that is being configured or a separate application used to configure other applications) to select parameters for configuring the application of the device. In some embodiments, the parameters include a URL associated with the organization. The URL can, for example, be used by the device to navigate to Web server 14, which may, for example host a portal associated with the organization. In some embodiments, the URL of the portal (which may be hosted by Web server 14) may be completely different than the URL of the general website (which may be hosted by server 24) of the organization and may not be easily entered or found by a user of mobile device 200. Accordingly, the automatic configuration provided by some embodiments disclosed herein through the interaction of mobile device 200 with rendered code 20 and setup server 44 can greatly simplify the user's experience with the systems of the organization.

In some embodiments, setup server 44 is the same server as server 24. In other embodiments, setup server 44 is distinct from server 24. In this latter case, setup server 44 may be operated by a third party and may be used to set up mobile devices for a variety of organizations. In such embodiments, storage device 48 may store parameters that are particular to a plurality of organizations. Processor 46 selects the appropriate parameters to be sent to mobile device 200 based on the message received from mobile device 200. For example, the message can include information that identifies a particular organization and processor 46 selects the appropriate parameters from storage device 48 based on the identified organization.

Figure 2:
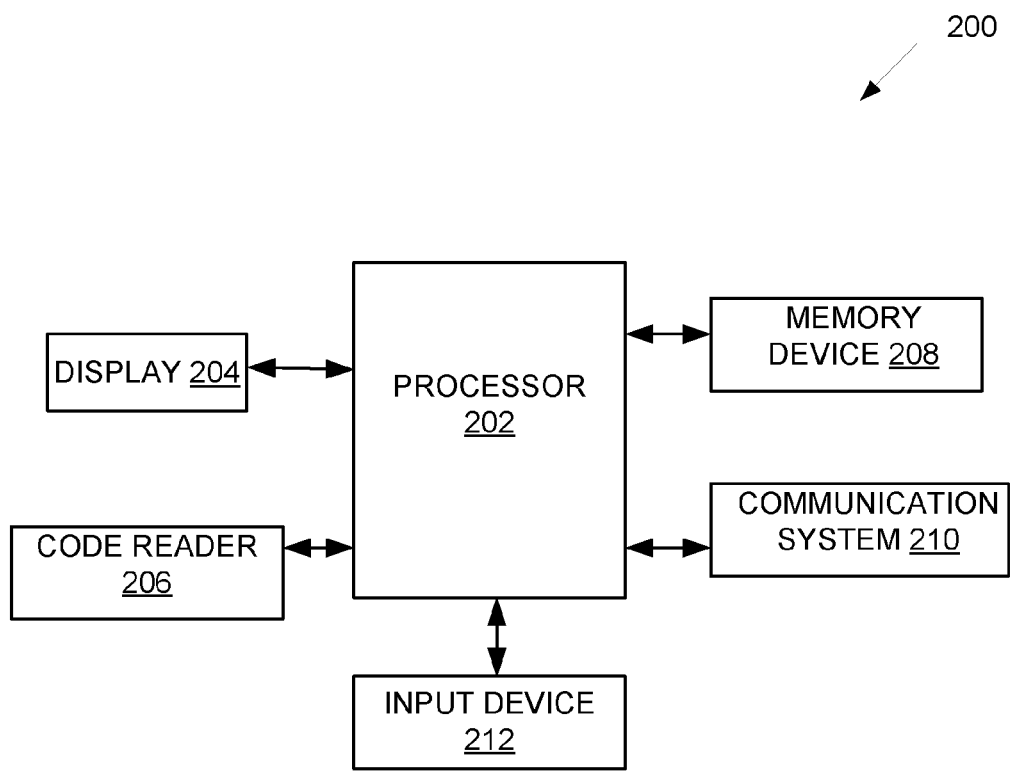
FIG. 2 is a block diagram of a mobile device according to various embodiments.

Reference is first made to FIG. 2, which illustrates a block diagram of a mobile device 200 according to various embodiments. Mobile device 200 comprises a processor 202, a display 204, a code reader 206, a memory device 208, a communication system 210, and an input device 212. Mobile device 200 is used to run one or more applications that interact with Web server 14 of an organization. In some embodiments, the application includes a browser that is used to interact with the portal of the organization. In some embodiments, the applications include specialized applications that are used during the user's interactions with the organization. For example, in some embodiments the organization is an educational institution and the applications include specialized applications that allow the user to manage his or her courses at the educational institution. In some embodiments, the applications are specialized in the sense that the applications are intended for a specific purpose (e.g., managing a class list and maintaining a timetable that is dynamically updated) but are generic in the sense that, prior to configuration, the applications are not specific to a particular university. In some such embodiments, the parameters obtained from setup server 44 configure the specialized application to be specific to a particular university at which the user is taking courses. In addition, in some embodiments the parameters obtained from the server and/or rendered code 20 configure the specialized application to be specific to a particular student or group of students.

Figure 3:
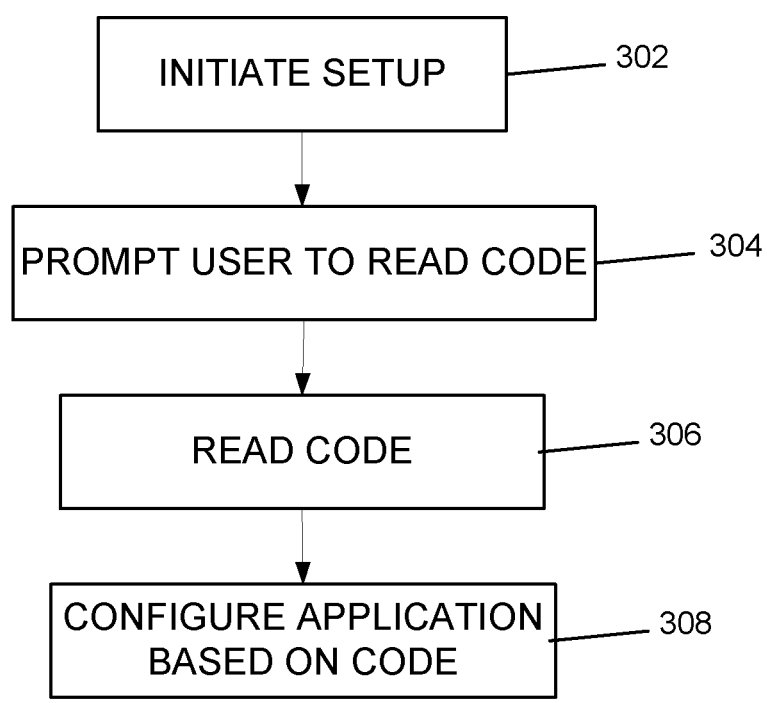
FIG. 3 is a flowchart diagram of a method of configuring a mobile device according to various embodiments.

Reference is now made to FIG. 3, which illustrates a flowchart diagram of a method of configuring an application on a mobile device such as, for example, the mobile device 200 of FIG. 2, according to various embodiments.

At step 302, the setup of an application is initiated. In some embodiments this step can be initiated by the user launching an application or by selecting a specific set up function in a running application.

At step 304, the user is prompted to read a code with code reader 206 of mobile device 200.

At step 306, code reader 206 reads the code. In various embodiments, code reader 206 is a camera. In some such embodiments, the rendered code 20 is read by using the camera to capture an image of the code and processing the image with an appropriate application (e.g., a code reading application) running on mobile device 200.

In some embodiments, steps 302 to 304 are accomplished by the user initiating a code reading application that allows the mobile device 200 to read a rendered code 20. In other words, in some embodiments, the rendered code 20 can include information necessary for determining which programs or applications are to be configured. In other words, the user need not launch the particular applications that he or she wishes to configure.

At step 308, the application is configured based on the code that was read at step 306. The application can be configured in various ways.

For example, in some embodiments, the code includes instructions and/or parameters for configuring the program. For example, in some embodiments, the code includes parameter values that are used to configured parameters of the application by, for example, setting the parameters to particular values. In some such embodiments, the program is completely configured based on information included in the code. For example, in some embodiments, the code is generated based on an organization and includes parameter values that are appropriate for use with systems of that organization. Such parameters can include such things as URLs of portals or webpages that may be different from the main web page of that organization.

Figure 4:
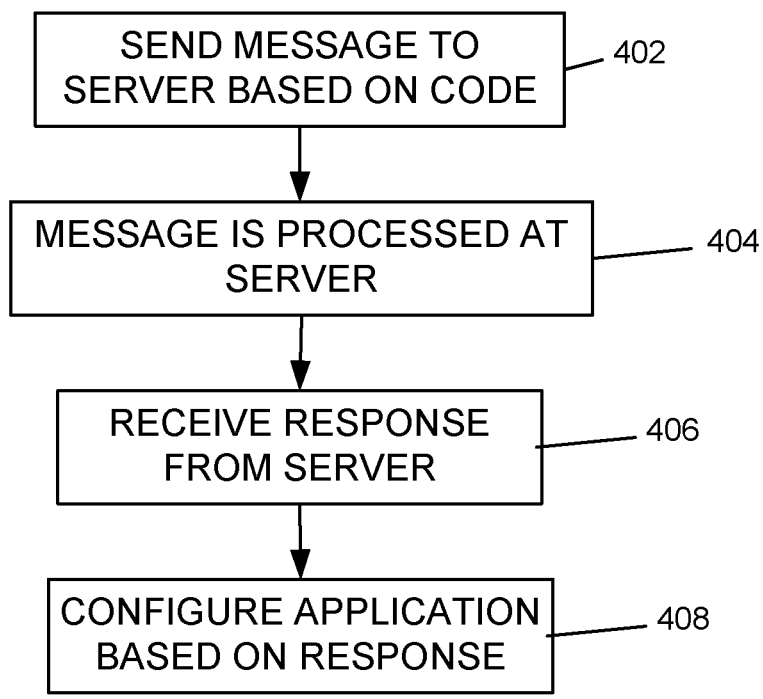
FIG. 4 is a flowchart diagram of a method of configuring a mobile device according to various embodiments.

In other embodiments, the program is partly configured based on information and/or instructions included in the code and partly based on information and instructions obtained from another source based on the code. FIG. 4, which is described in greater detail below, illustrates a method according to such embodiments.

In some embodiments, the application that is to be configured on the device may not actually reside on the device at the time that the code is read. In some such embodiments, the code includes instructions and information that is used by mobile device 200 to download one or more applications from an appropriate server, such as for example, setup server 44. In some embodiments, the application or applications can be automatically downloaded, after the code has been processed, without the user's involvement. In some embodiments, the user actively downloads the application that is to be configured prior to rendered code 20 or may be prompted to navigate to a particular website where he or she can "manually" download the application after reading rendered code 20. In the latter case, the application can be configured after the application has been downloaded.

Reference is now made to FIG. 4, which illustrates a flowchart diagram of a method of configuring a program on mobile device 200 of FIG. 1, according to various embodiments. The method illustrated in FIG. 4 corresponds to step 308 of FIG. 3, according to some embodiments.

At step 402, the mobile device 200 sends a message to a server based on the rendered code 20 that the mobile device 200 read such as, for example, the rendered code 20 that was read at step 306 of FIG. 3. In such embodiments, the code includes a URL of setup server 44 and thereby allows the device to send messages to the setup server.

In some embodiments, the device sends information that is exclusively obtained from the code. In some embodiments, depending on how the code is generated, the code can include information particular to the user or it may simply include information that is generic with respect to users but is particular to the organization. In other embodiments, the device sends additional information, such as for example, but not limited to, information pertaining to the device or application (e.g., version information) or the user of the device. In some embodiments, some or all of this information may be obtained automatically from the device itself or an application running on the mobile device. Alternatively some or all of this information may be obtained from the code based on information (e.g., user entered information) that was used to generate or request generation of the rendered code 20.

At step 404, the message is processed at the server. In some embodiments, this includes setup server 44 identifying one or more relevant parameters based on the message that was sent at step 402. In some embodiments, the one or more parameters includes a URL associated with the organization. In some embodiments, the parameters can include parameters for configuring an application of the mobile device 200 to be optimized for use with the systems and programs of a particular organization. The server sends the parameters back to the mobile device 200.

At step 406, the mobile device 200 receives a response from the server. In some embodiments, the response from the server includes the parameters. In other embodiments, the response includes information that an application running on the device can use to select appropriate parameters. As mentioned above, the parameters can include one or more URLs.

At step 408, the application is configured based on the response received from the server at step 406. In some embodiments where the parameters include a URL for the organization, step 408 can comprise navigating a browser of the device to the URL. For example, the URL may be a portal of the organization identified by the code and step 408 can include navigating to the portal and logging the user into the portal.

In various embodiments, a single code can be used to configure multiple applications on a mobile device 200. Some of the disclosed embodiments can greatly simplify a users experience by automating at least part of the configuration process of their mobile device such that it can operate in conjunction with systems of an organization, for example, but not limited to, an educational institution.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A processor implemented method of configuring an application on a smart phone device comprising a code reading device, the method comprising
    reading a code associated with a first application with the code reading device, the code relating to an organization, wherein the code comprises an organization identification (ID) related to the organization;
    identifying at least one parameter associated with the organization ID; and
    configuring the at least one parameter of the first application of the smart phone device based on the code.

2. The method of claim 1, wherein the code comprises a value of the at least one parameter.

3. The method of claim 1, wherein the smart phone device comprises a storage device having stored thereon parameters associated with a plurality of organizations; and wherein identifying the at least one parameter comprises:
    searching the storage device for the at least one parameter based on the organization ID.

4. The method of claim 1, wherein identifying the at least one parameter comprises:
    transmitting a message to a server, the message comprising an identifier of the organization;
    receiving a response; and
    identifying the at least one parameter based on the response.

5. The method of claim 1, wherein the code comprises an identifier of a server, the method further comprising:
    transmitting a message to the server, the message comprising an identifier of the first application;
    receiving a response; and
    identifying the at least one parameter based on the response.

6. The method of claim 5, wherein the response comprises the at least one parameter of the first application.

7. The method of claim 5, wherein the message identifies the first application.

8. The method of claim 7, wherein the message comprises version information for the first application.

9. The method of claim 1, further comprising:
    setting at least one parameter of a second application of the smart phone device based on the code, the parameter corresponding to the organization.

10. A non-transitory machine-readable memory storing statements and instructions for execution by a processor for implementing of configuring an application on a smart phone device comprising a code reading device, the method comprising:
    reading a code associated with a first application with the code reading device, the code relating to an organization, wherein the code comprises an organization identification (ID) related to the organization;
    identifying at least one parameter associated with the organization ID; and
    configuring the at least one parameter of the first application of the smart phone device based on the code.

11. A smart phone device, comprising:
    a code reading device; and
    a processor coupled to the code reading device, the processor configured to:
        accept an input from the code reading device based on a code associated with a first application relating to an organization, wherein the code comprises an organization identification (ID) related to the organization;
        identify at least one parameter associated with the organization ID; and
        set the at least one parameter of the first application of the smart phone device based on the code.

12. The smart phone device of claim 11, wherein the code comprises a value of the at least one parameter.

13. The smart phone device of claim 11, further comprising:
    a storage device having stored thereon parameters associated with a plurality of organizations; and wherein the processor is further configured to:
    search the storage device for the at least one parameter based on the organization ID.

14. The smart phone device of claim 11, wherein the processor is configured to:
    transmit a message to a server, the message comprising an identifier of the organization;
    receive a response; and
    identify the at least one parameter based on the response.

15. The smart phone device of claim 14, wherein the response comprises the at least one parameter of the first application.

16. The smart phone device of claim 14, wherein the message identifies the first application.

17. The smart phone device of claim 11, wherein the code comprises an identifier of a server; and wherein the processor is further configured to:
    transmit a message to the server, the message comprising an identifier of the first application;
    receive a response; and
    identify the at least one parameter based on the response.

18. The smart phone device of claim 11, wherein the processor is further configured to:
    set at least one parameter of a second application of the smart phone device based on the code, the parameter corresponding to the organization.

\* \* \* \* \*